United States Patent
Zhang

(10) Patent No.: US 10,009,112 B2
(45) Date of Patent: Jun. 26, 2018

(54) ELECTROMAGNETIC INTERFERENCE REDUCTION

(71) Applicant: FINISAR CORPORATION, Sunnyvale, CA (US)

(72) Inventor: Yongshan Zhang, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days. days.

(21) Appl. No.: 14/980,943

(22) Filed: Dec. 28, 2015

(65) Prior Publication Data

US 2016/0191161 A1 Jun. 30, 2016

Related U.S. Application Data

(60) Provisional application No. 62/096,942, filed on Dec. 26, 2014.

(51) Int. Cl.
*H04B 10/50* (2013.01)

(52) U.S. Cl.
CPC ................ *H04B 10/503* (2013.01)

(58) Field of Classification Search
CPC ... H04B 10/2507; H04B 10/40; H04B 10/503
USPC .................................................. 398/182–201
See application file for complete search history.

(56) References Cited

U.S. PATENT DOCUMENTS

| | | | | |
|---|---|---|---|---|
| 4,255,750 A * | 3/1981 | Riley | ................ | G01R 29/0878 324/627 |
| 4,267,590 A * | 5/1981 | Bosotti | ............. | H04B 10/2503 398/154 |
| 4,864,310 A * | 9/1989 | Bernard | ............... | H01Q 3/2676 398/87 |
| 5,157,308 A * | 10/1992 | Rindal | ..................... | H04N 9/20 315/85 |
| 6,122,336 A * | 9/2000 | Anderson | ................. | H03L 7/07 327/153 |
| 6,144,242 A * | 11/2000 | Jeong | .................... | H04L 25/085 327/269 |
| 6,381,048 B1 * | 4/2002 | Chraplyvy | ......... | H04B 10/2557 398/79 |
| 6,563,613 B1 * | 5/2003 | Tochio | ................ | H04B 10/077 398/25 |
| 6,600,771 B1 * | 7/2003 | Moon | ....................... | G06F 1/04 327/269 |
| 6,619,867 B1 * | 9/2003 | Asahi | ................... | H04B 10/506 398/102 |
| 7,136,593 B1 * | 11/2006 | Yano | ...................... | H04J 14/02 398/102 |
| 7,155,128 B2 * | 12/2006 | Roberts | ............. | H04B 10/2563 398/154 |

(Continued)

*Primary Examiner* — Ken N Vanderpuye
*Assistant Examiner* — Dibson Sanchez
(74) *Attorney, Agent, or Firm* — Maschoff Brennan

(57) ABSTRACT

A method of reducing electromagnetic interference in a multi-channel transmitter is described. The method may include receiving multiple signals configured to be transmitted through multiple channels. The method may additionally include adjusting delays of the multiple signals to generate multiple delayed signals. Each two adjacent delayed signals may be configured to have a corresponding phase difference that satisfies a phase delay requirement. The method may additionally include generating multiple load signals from the multiple delayed signals.

18 Claims, 10 Drawing Sheets

(56) References Cited

U.S. PATENT DOCUMENTS

| | | | |
|---|---|---|---|
| 7,277,644 B2 * | 10/2007 | Johnson | H03M 13/1515 398/118 |
| 7,343,101 B1 * | 3/2008 | Frankel | H04B 10/2543 398/158 |
| 7,920,795 B2 * | 4/2011 | Wang | H04B 10/2537 398/183 |
| 9,106,051 B1 * | 8/2015 | Goodno | H01S 3/2391 |
| 2002/0136321 A1 * | 9/2002 | Chan | H04L 12/10 375/295 |
| 2003/0030865 A1 * | 2/2003 | Yamada | H04J 14/02 398/79 |
| 2008/0107422 A1 * | 5/2008 | Cole | H03M 9/00 398/135 |
| 2009/0310967 A1 * | 12/2009 | Wang | H04B 10/2537 398/69 |

* cited by examiner

ELECTROMAGNETIC INTERFERENCE REDUCTION

CROSS-REFERENCE TO RELATED APPLICATION

This application claims the benefit of and priority to U.S. Provisional App. No. 62/096,942, filed Dec. 26, 2014, which is incorporated herein by reference.

FIELD

Some embodiments described herein generally relate to reducing electromagnetic interference and cross-talk between parallel laser drivers.

BACKGROUND

Unless otherwise indicated herein, the materials described herein are not prior art to the claims in the present application and are not admitted to be prior art by inclusion in this section.

Electromagnetic interference (EMI) may include disturbance that affects an electrical circuit due to either electromagnetic induction or electromagnetic radiation emitted from an external source. The disturbance may interrupt, obstruct, degrade or limit the effective performance of the electrical circuit. A transceiver may have a stronger EMI emission at a bit rate frequency compared to other frequencies since asymmetric electrical waveforms that pass through the transceiver may include sinusoidal waves with the bit rate frequency. In some applications, it may be unavoidable to have asymmetric electrical waveforms in order to meet requirements of the transceiver. The asymmetric electrical waveforms may include duty cycle distortion, unequal rise and fall times, boost, and/or other features that may cause asymmetry of the electrical waveforms. If multiple parallel laser drivers are implemented in the transceiver, a higher EMI emission may be generated compared to using a single laser driver.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to reducing electromagnetic interference and cross-talk between parallel laser drivers.

In an example embodiment, a method of reducing electromagnetic interference in a multi-channel transmitter is described. The method may include receiving multiple signals configured to be transmitted through multiple channels. The method may additionally include adjusting delays of the multiple signals to generate multiple delayed signals. Each two adjacent delayed signals may be configured to have a phase difference that satisfies a phase delay requirement. The method may additionally include generating multiple load signals from the multiple delayed signals.

In another example embodiment, a system of reducing electromagnetic interference in a multi-channel transmitter is described. The system may include a delay array configured to receive multiple signals configured to be transmitted through multiple channels. The delay array may be configured to adjust delays of the multiple signals to generate multiple delayed signals. Each two adjacent delayed signals are configured to have a phase difference that satisfies a phase delay requirement. The system may additionally include a laser driver array communicatively coupled to the delay array. The laser driver array may be configured to receive the multiple delayed signals from the delay array and to generate multiple load signals from the multiple delayed signals.

In yet another example embodiment, a multi-channel transmitter with a reduced electromagnetic interference emission is described. The transmitter may include multiple delay units configured to receive multiple signals that are configured to be transmitted through multiple channels. The multiple delay units may be configured to adjust delays of the multiple signals by respective delay values to generate multiple delayed signals. Each two adjacent delayed signals may be configured to have a phase difference that satisfies a phase delay requirement. The phase difference may be configured to reduce EMI emitted by multiple laser drivers. The transmitter may additionally include the multiple laser drivers communicatively coupled to the multiple delay units. The multiple laser drivers may be configured to receive the multiple delayed signals from the multiple delay units and to generate multiple load signals from the multiple delayed signals. The transmitter may additionally include multiple laser diodes communicatively coupled to the multiple laser drivers. The multiple laser diodes may be configured to receive the multiple load signals from the multiple laser drivers and to generate multiple optical carriers based on the multiple load signals. The transmitter may additionally include a multiplexer optically coupled to the multiple laser diodes. The multiplexer may be configured to multiplex the multiple optical carriers onto an optical link for transmission through the optical link.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein generally relate to reducing EMI and cross-talk between parallel laser drivers.

Some embodiments described herein may include applying phase cancellation to suppress EMI and/or cross-talk between parallel laser drivers. For example, delay units may adjust delays of signals (e.g., data streams) by respective delay values to output respective delayed signals. The respective delay values may be configured such that each two adjacent delayed signals may have a phase difference $\xi$ that satisfies a phase delay requirement. For example, if a multi-channel transmitter or transceiver has N parallel channels (e.g., N=2, 3, 4, or another positive integer), the phase delay requirement may include that: (1) the phase difference $\xi$ between each two adjacent delayed signals may have a value of $2\pi p/N$, with p=1, 2, or another positive integer; and (2) the phase difference $\xi$ may satisfy $\sin(\xi/2) \neq 0$. Equivalently the two adjacent delayed signals may include a time delay of $T_B/N$ or a multiple of $T_B/N$, where $T_B$ may represent a time duration to transmit a single bit in a channel. Alternatively, corresponding phase differences between adjacent delayed signals may not be a constant. The phase delay requirement may require that the corresponding phase differences enable a field strength of related parallel laser drivers to be zero, as described below with reference to FIG. 1D. The delayed signals may be inputted to laser drivers for processing. The phase difference between each two adjacent delayed signals may be configured to reduce the EMI emitted by the laser drivers at a data rate frequency and other frequencies and to reduce cross-talk between the laser drivers.

More generally, technologies described herein may be implemented to reduce EMI and cross-talk of transceivers that include parallel laser drivers (e.g., quad laser drivers in QSFP28 and CFP4 transceiver modules).

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1A:
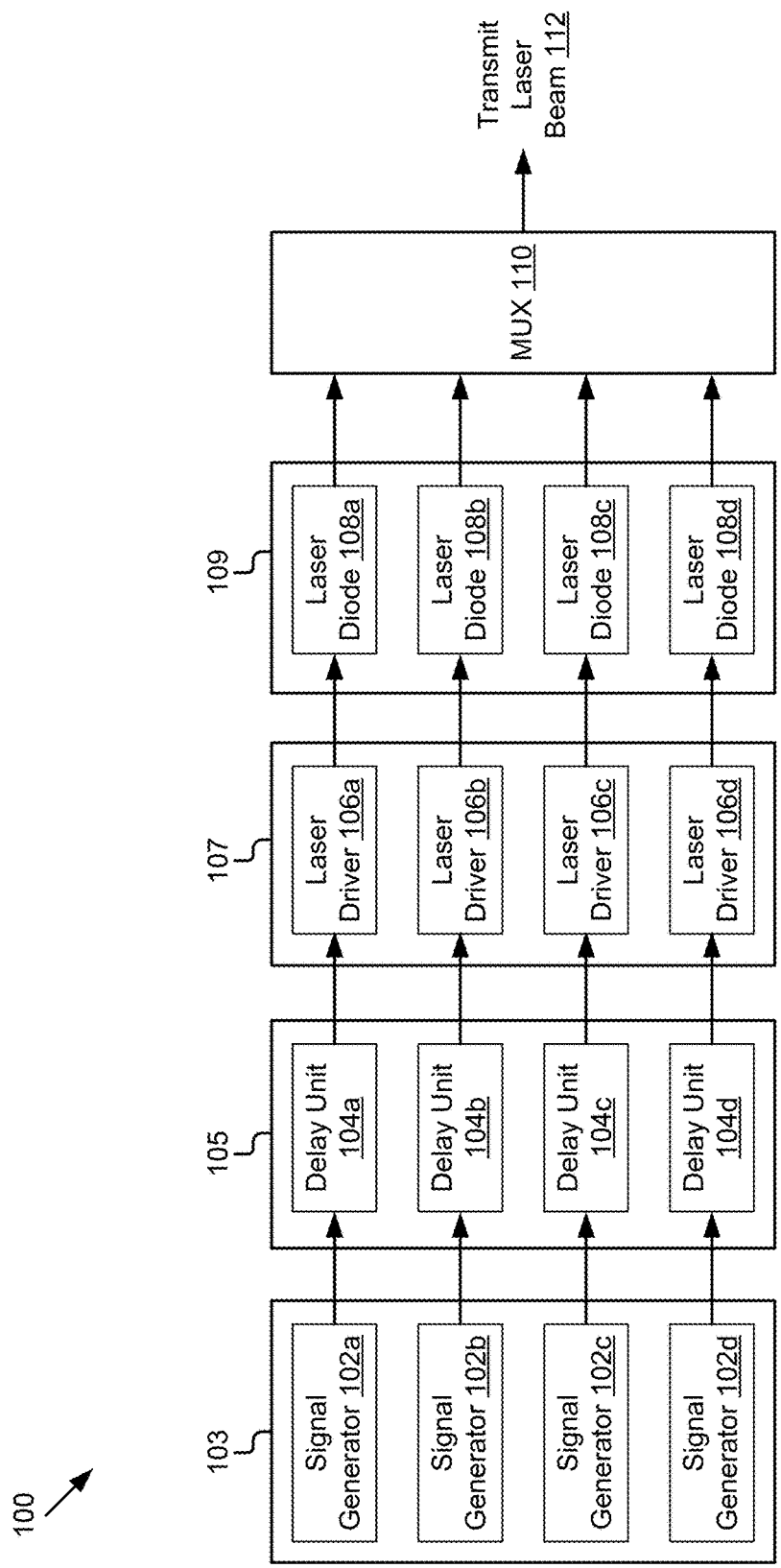
FIG. 1A is a block diagram of an example structure of a transmitter.

FIG. 1A is a block diagram of an example structure of a transmitter 100, arranged in accordance with at least some embodiments described herein. The transmitter 100 may be a multi-channel transmitter capable of transmitting data using multiple channels. In some embodiments, the transmitter 100 may be included in a transceiver such as a QSFP28 or another suitable type of transceiver. The transmitter 100 may include a signal generator array 103, a delay array 105, a laser driver array 107, a laser array 109, a multiplexer (MUX) 110, and any other suitable components.

The signal generator array 103 may include one or more signal generators 102. For example, the signal generator array 103 may include signal generators 102a, 102b, 102c, and 102d. Each signal generator 102 may receive a respective stream of data configured to transmit to a receiver using a different channel. Each signal generator 102 may process the respective stream of data to generate a signal encoded with the respective stream of data. The signal may include an electrical waveform that carriers the respective stream of data. For example, the signal generator 102a may apply a modulation technique to modulate a radio carrier with a stream of data and may output a modulated radio carrier to a delay unit 104a. Similarly, the signal generators 102b, 102c, and 102d may generate their respective signals. As a result, multiple signals (e.g., multiple electrical waveforms each encoded with a respective stream of data) may be generated by multiple signal generators 102 and may be outputted to multiple delay units 104, respectively.

Example modulation techniques may include, but are not limited to, a quadrature amplitude modulation (QAM) technique, a phase-shift keying (PSK) technique, a frequency-shift keying (FSK) technique, an amplitude-shift keying (ASK) technique, non-return-to-zero (NRZ) line coding, pulse-amplitude modulation (PAM), and any other suitable modulation techniques.

The delay array 105 may include one or more delay units 104. For example, the delay array 105 may include delay units 104a, 104b, 104c, and 104d. The delay units 104 may receive signals from the signal generators 102, respectively. The delay units 104 may adjust delays of the signals to output delayed signals. For example, the signals may be adjusted by respective delay values so that each two adjacent delayed signals may be configured to have a phase difference or a phase delay that satisfies a phase delay requirement. The phase difference and the phase delay requirement are described below with reference to at least FIGS. 1B-1D. In some embodiments, two delayed signals may be referred to as two adjacent delayed signals if they are configured to be transmitted through two adjacent channels. As described below, two adjacent delayed signals may be inputted to and processed by two adjacent laser drivers 106 in the laser driver array 107, respectively.

For example, the signals may include a first signal from the signal generator 102a, a second signal from the signal generator 102b, a third signal from the signal generator 102c, and a fourth signal from the signal generator 102d. The delay unit 104a may delay the first signal by a first delay value to output a first delayed signal. In some embodiments, the first delay value may be zero so that the first delayed signal may be the same as the first signal. The delay unit 104b may delay the second signal by a second delay value to output a second delayed signal. The second delay value may be configured to cause a phase difference between the second delayed signal and the first delayed signal to satisfy the phase delay requirement. The delay unit 104c may delay the third signal by a third delay value to output a third delayed signal. The third delay value may be configured to cause a phase difference between the third delayed signal and the second delayed signal to satisfy the phase delay requirement. The delay unit 104d may delay the fourth signal by a fourth delay value to output a fourth delayed signal. The fourth delay value may be configured to cause a phase difference between the fourth delayed signal and the third delayed signal to satisfy the phase delay requirement.

The laser driver array 107 may include one or more laser drivers 106. For example, the laser driver array 107 may include laser drivers 106a, 106b, 106c, and 106d. The laser drivers 106 may receive the delayed signals from the delay units 104 and may process the delayed signals to generate load signals for laser diodes 108, respectively. For example, the laser drivers 106 may amplify the delayed signals and may output the amplified signals as load signals for loading to the laser diodes 108, respectively.

In some embodiments, the laser drivers 106 may include closely placed parallel laser drivers with bond wires. To analyze EMI emission of the laser drivers 106, the laser array 107 may be viewed as a uniform linear phased array that has radiation peaks and valleys. The EMI of the laser drivers 106 may be reduced significantly by placing the radiation of the uniform linear phased array at a radiation valley, which may be accomplished by selecting suitable phase delays between inputs of adjacent laser drivers as described herein. The mechanism of suppressing EMI and/or cross-talk by adjusting phase delays between inputs of the laser drivers 106 may be referred to herein as phase cancellation.

Figure 1B:
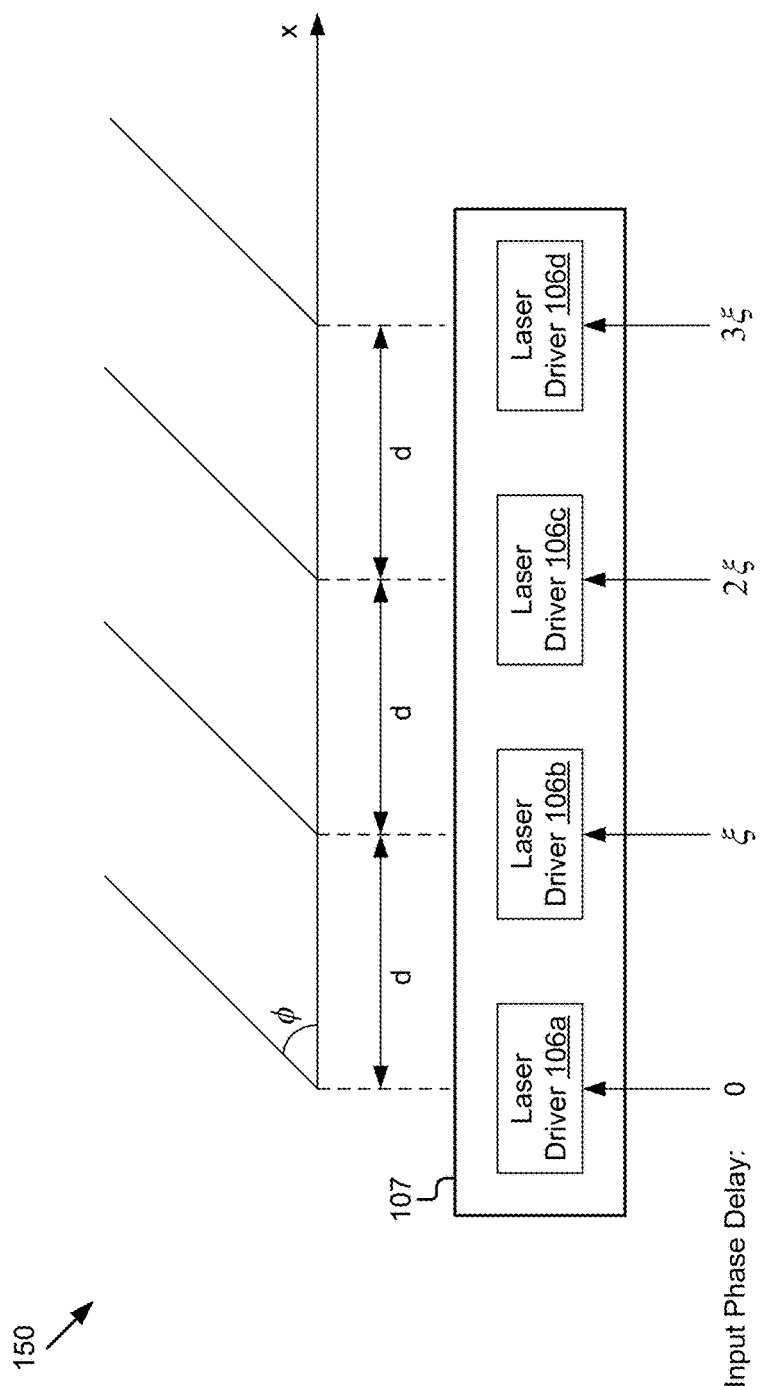
FIG. 1B is an example graphic representation that illustrates an example parallel laser driver array as a uniform linear phased array.

FIG. 1B is an example graphic representation 150 that illustrates the laser array 107 with parallel laser drivers 106 as a uniform linear phased array, arranged in accordance with at least some embodiments described herein. A radiated field "E" of the uniform linear phased array may be proportional to an array factor of the radiated field. For example, $|E| \propto |A(\Psi)|$, where $|A(\Psi)|$ may represent the array factor of the radiated field, $$|A(\Psi)| = \frac{1}{N}\left|\frac{\sin(N\Psi/2)}{\sin(\Psi/2)}\right|,$$

$\Psi = \beta d \cos \phi + \xi$, N may represent a number of radiation elements such as a number of the laser drivers 106 (e.g., N may also represent a number of parallel channels such as N=4 or another integer), d may represent a separation distance between two adjacent radiation elements, $\xi$ may represent a phase difference between adjacent radiation elements, $\beta$ may represent a wave number, and $\phi$ may represent an observation angle. Since $\beta d \ll \xi$, then $\Psi = \beta d \cos \phi + \xi \approx \xi$ and the array factor may be expressed as:

$$|A(\Psi)| = \frac{1}{N}\left|\frac{\sin(N\Psi/2)}{\sin(\Psi/2)}\right| \approx \frac{1}{N}\left|\frac{\sin(N\xi/2)}{\sin(\xi/2)}\right|.$$

For N=2, 3, 4, 5, or another positive integer greater than 1, the array factor $|A(\Psi)|$ may approach zero (e.g., $$\left(\text{e.g., } |A(\Psi)| \approx \frac{1}{N}\left|\frac{\sin(N\xi/2)}{\sin(\xi/2)}\right| = 0\right) \text{ if } \xi = \frac{2\pi p}{N}$$

with p=1, 2, 3, or another suitable positive integer and may also satisfy $\sin(\xi/2) \neq 0$. As a result, the radiated field of the uniform linear phased array may be reduced by configuring a phase delay between inputs of two adjacent radiation elements to satisfy the phase delay requirement. Similarly, EMI of the parallel laser drivers 106 may be reduced by configuring their adjacent input signals (e.g., adjacent delayed signals) to have a phase difference that satisfies the phase delay requirement.

Alternatively, the closely placed parallel laser drivers 106 with bond wire may be viewed as a single EMI source with a field strength $E_e$. To eliminate the EMI, the field strength $E_e$ may satisfy:

$$E_e = \sum_{i=0}^{N-1} e^{j\omega\theta_i} = 0,$$

where a corresponding laser driver 106 may be associated with a corresponding field vector $e^{j\Omega\theta_i}$ and $\theta_i$ may represent a phase of the corresponding laser driver 106. A phase difference between two corresponding adjacent laser drivers 106 may be represent as $\xi_i = \theta_i - \theta_{i-1}$. The phase differences $\xi_i$ (with i=1, 2 or another suitable integer) may not be the same for different values of i, which means field vectors $e^{j\Omega\theta_i}$ do not need to be equally spaced in a unit circle, as long as a summation of the field vectors $e^{j\Omega\theta_i}$ approaches zero.

Figure 1C:
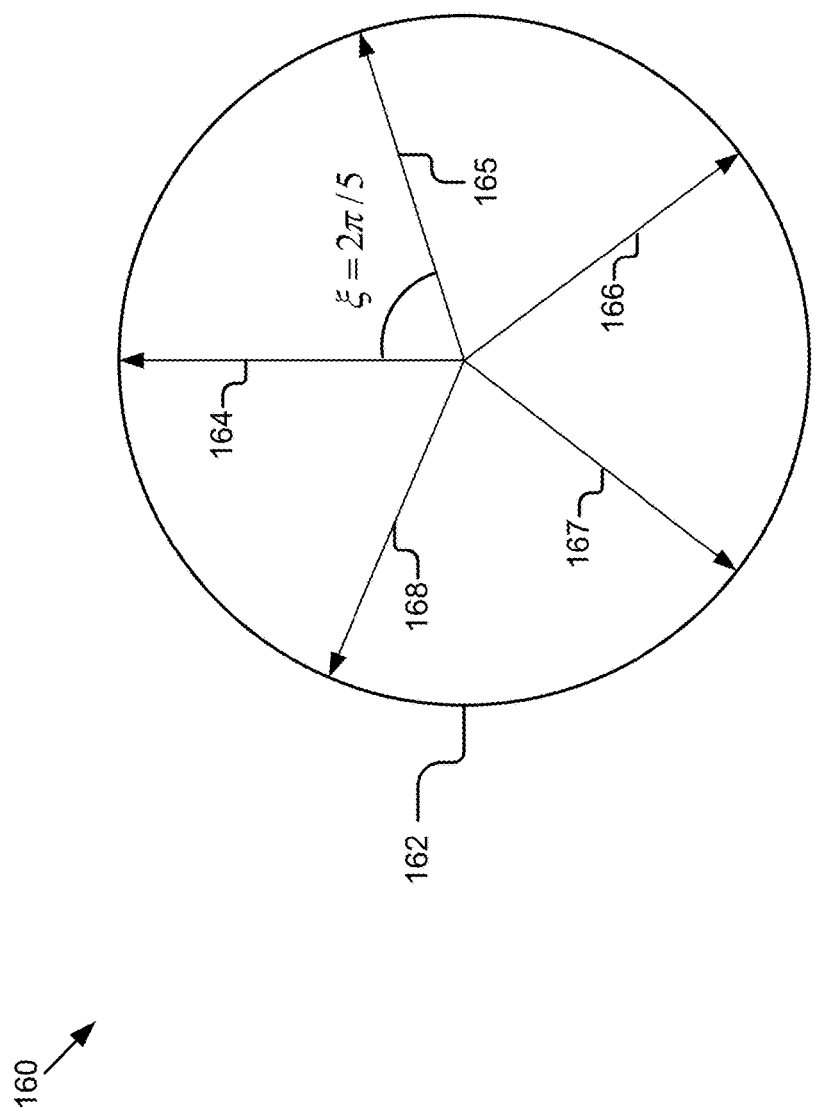
FIG. 1C is an example graphic representation that illustrates corresponding phase delays between each two adjacent channels for a multi-channel transmitter with five channels.

FIG. 1C is an example graphic representation 160 that illustrates corresponding phase delays between each two adjacent channels for a multi-channel transmitter with five channels (or correspondingly five laser drivers), arranged in accordance with at least some embodiments described herein. The field vectors ($e^{j\Omega\theta_i}$) 164, 165, 166, 167, and 168 are equally distributed in a unit circle 162, with an equal phase difference between each two adjacent field vectors. The phase difference has a value of $\xi = 2\pi/5$. Thus, a phase difference between each two adjacent laser drivers 106 may have a value of $2\pi/5$. Alternatively, a phase difference between each two adjacent laser drivers 106 may have a value of a multiple of $2\pi/5$. Equivalently, each two adjacent delayed signals may include a time delay of $T_B/5$ or a multiple of $T_B/5$, where $T_B$ may represent a time duration to transmit a single bit in a channel.

Figure 1D:
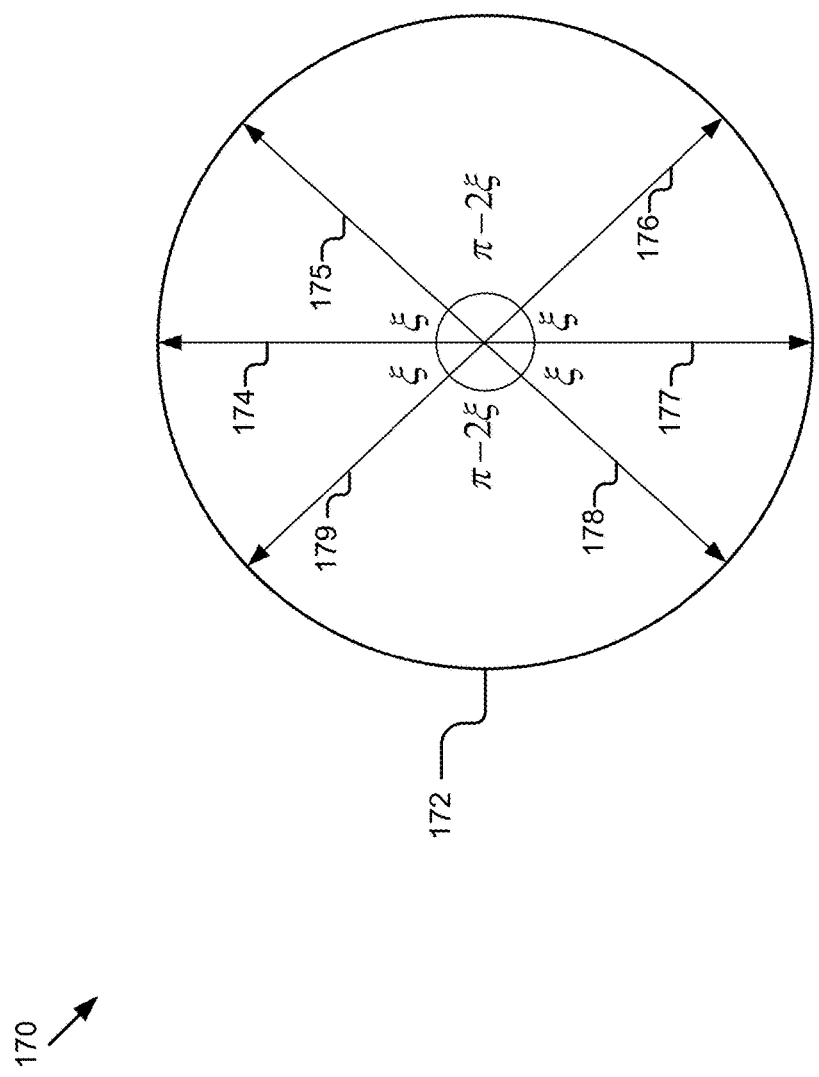
FIG. 1D is an example graphic representation that illustrates corresponding phase delays between each two adjacent channels for a multi-channel transmitter with six channels.

FIG. 1D is an example graphic representation 170 that illustrates corresponding phase delays between each two adjacent channels for a multi-channel transmitter with six channels (or correspondingly six laser drivers), arranged in accordance with at least some embodiments described herein. The field vectors ($e^{j\Omega\theta_i}$) 174, 175, 176, 177, 178, and 179 are unequally distributed in a unit circle 172, with a first phase difference between the field vector 174 and the field vector 175 to be $\xi$, a second phase difference between the field vector 175 and the field vector 176 to be $\pi-2\xi$, a third phase difference between the field vector 176 and the field vector 177 to be $\xi$, a fourth phase difference between the field vector 177 and the field vector 178 to be $\xi$, a fifth phase difference between the field vector 178 and the field vector 179 to be $\pi-2\xi$, and a sixth phase difference between the field vector 179 and the field vector 174 to be $\xi$. $\xi$ may have an arbitrary non-zero value. The phase differences between the field vectors 174-179 may match the phase differences between adjacent laser drivers 106 or adjacent channels.

Returning to FIG. 1A, the laser array 109 may include one or more laser diodes 108. For example, the laser array 109 may include laser diodes 108a, 108b, 108c, and 108d. Each laser diode 108 may include a vertical-cavity surface-emitting laser (VCSEL) or another suitable laser. The laser array 109 may include a VCSEL array. In some embodiments, the laser array 109 may include multiple laser diodes 108, with each laser diode 108 configured to emit an optical carrier with a different wavelength according to a respective input load signal. The laser diodes 108 may receive load signals from the laser drivers 106 and may emit optical carriers based on the load signals, respectively.

The MUX 110 may multiplex the optical carriers outputted from the laser array as a transmit laser beam 112 and may pass the transmit laser beam 112 to an optical link for transmission to a receiver. The MUX 110 may include a wavelength-division multiplexing (WDM) multiplexer. In the example of FIG. 1A, the optical link may include a single optical fiber.

In other implementations, the optical link may include multiple optical fibers, or more particularly, at least a same number of optical fibers as laser diodes 108. The multiple optical fibers may be included in a parallel fiber bundle. In these and other implementations, the MUX 110 may be omitted and the laser diodes 108 may be configured to emit optical carriers at the same (or different) wavelengths, each for transmission through a different one of the optical fibers.

Figure 2:
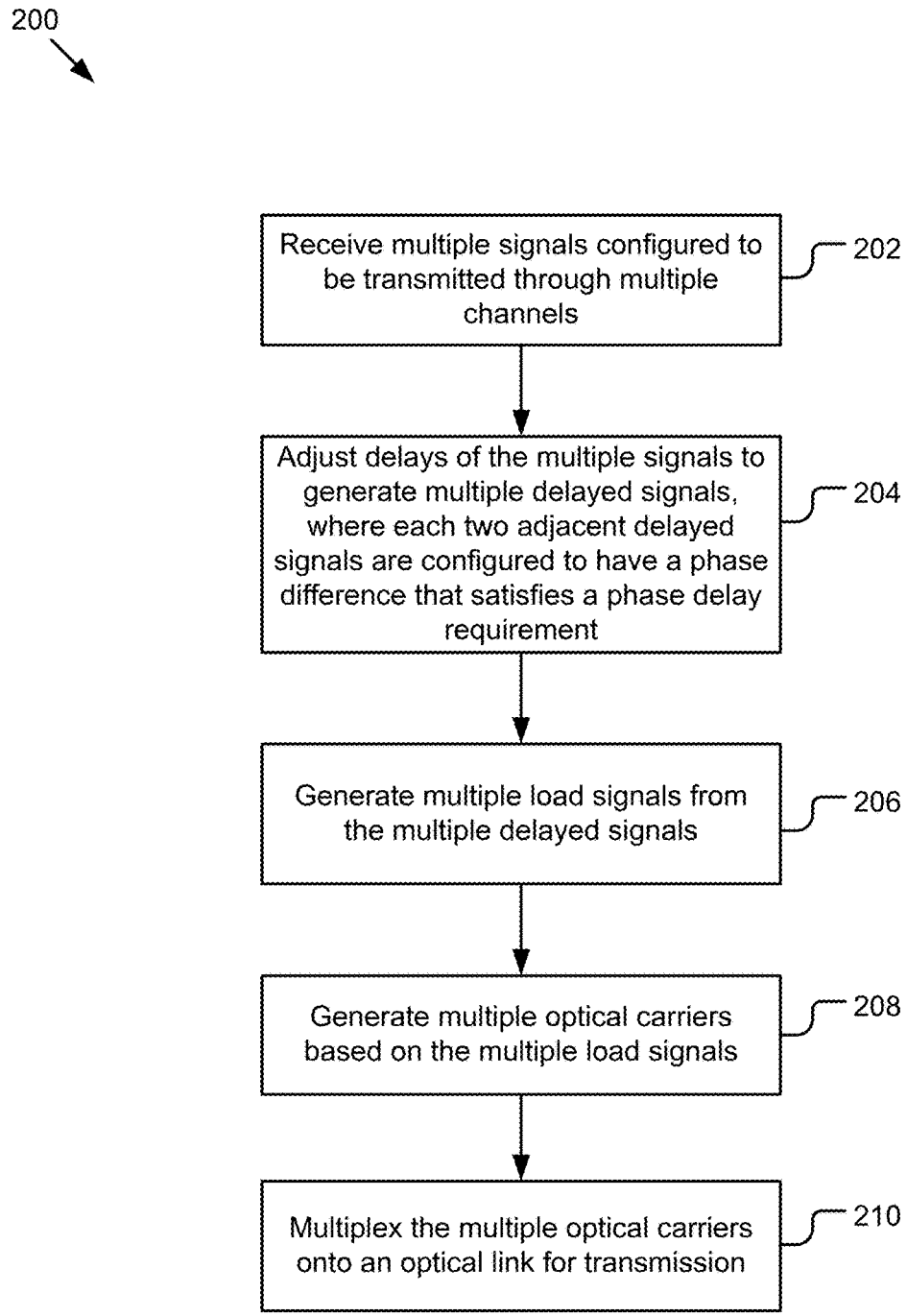
FIG. 2 shows an example flow diagram of a method of transmitting signals with a reduced EMI emission.

FIG. 2 shows an example flow diagram of a method 200 of transmitting signals with a reduced EMI emission, arranged in accordance with at least some embodiments described herein. The method 200 may be performed in whole or in part by a transmitter (e.g., the transmitter 100 of FIG. 1A). Although illustrated as discrete blocks, various blocks may be divided into additional blocks, combined into fewer blocks, or eliminated, depending on the desired implementation.

The method 200 may begin at block 202 in which multiple signals may be received. For example, the delay array 105 of FIG. 1A may receive multiple signals from the signal generator array 103 of FIG. 1A. The multiple signals may be configured to be w transmitted through multiple channels, respectively.

At block 204, delays of the multiple signals may be adjusted to generate multiple delayed signals. Each two adjacent delayed signals to be transmitted on two adjacent channels may be configured to have a phase difference that satisfies a phase delay requirement. For example, respective delay values may be applied to the multiple signals so that each two adjacent delayed signals may have a phase difference that satisfies the phase delay requirement. In some embodiments, the delays of the multiple signals may be adjusted as described above with respect to FIGS. 1A-1D.

At block 206, multiple load signals may be generated from the multiple delayed signals. For example, the laser drivers 106 of FIG. 1A may receive the multiple delayed signals from the delay units 104 of FIG. 1A and may generate multiple load signals based on the multiple delayed signals, respectively.

At block 208, multiple optical carriers may be generated by multiple laser diodes (e.g., the laser diodes 108 of FIG. 1A) based on the multiple load signals, respectively. Each optical carrier may have a different wavelength from the other optical carriers or the same wavelength, depending on the implementation. The multiple optical carriers may include optical carriers emitted from VCSELs or any other suitable lasers.

At block 210, the multiple optical carriers may be multiplexed by a multiplexer (e.g., the MUX 110 of FIG. 1A) onto an optical link for transmission to a receiver. The operation of block 210 may be omitted in implementations that omit the multiplexer.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Some embodiments disclosed herein include an article of manufacture such as a non-transitory computer storage medium having instructions stored thereon that are executable by a computing device to perform or control performance of operations included in the method 200 of FIG. 2, such as the operations illustrated by blocks 202, 204, 206, 208, and/or 210 in FIG. 2, and/or variations thereof. The non-transitory computer storage medium may be included in or may be accessible to a computing device such as a computing device 600 of FIG. 6 or a digital signal processing (DSP) unit that includes a processor and a memory. In some embodiments, the non-transitory computer storage medium may be included in or may be accessible to the transmitter 100 of FIG. 1A.

Figure 3:
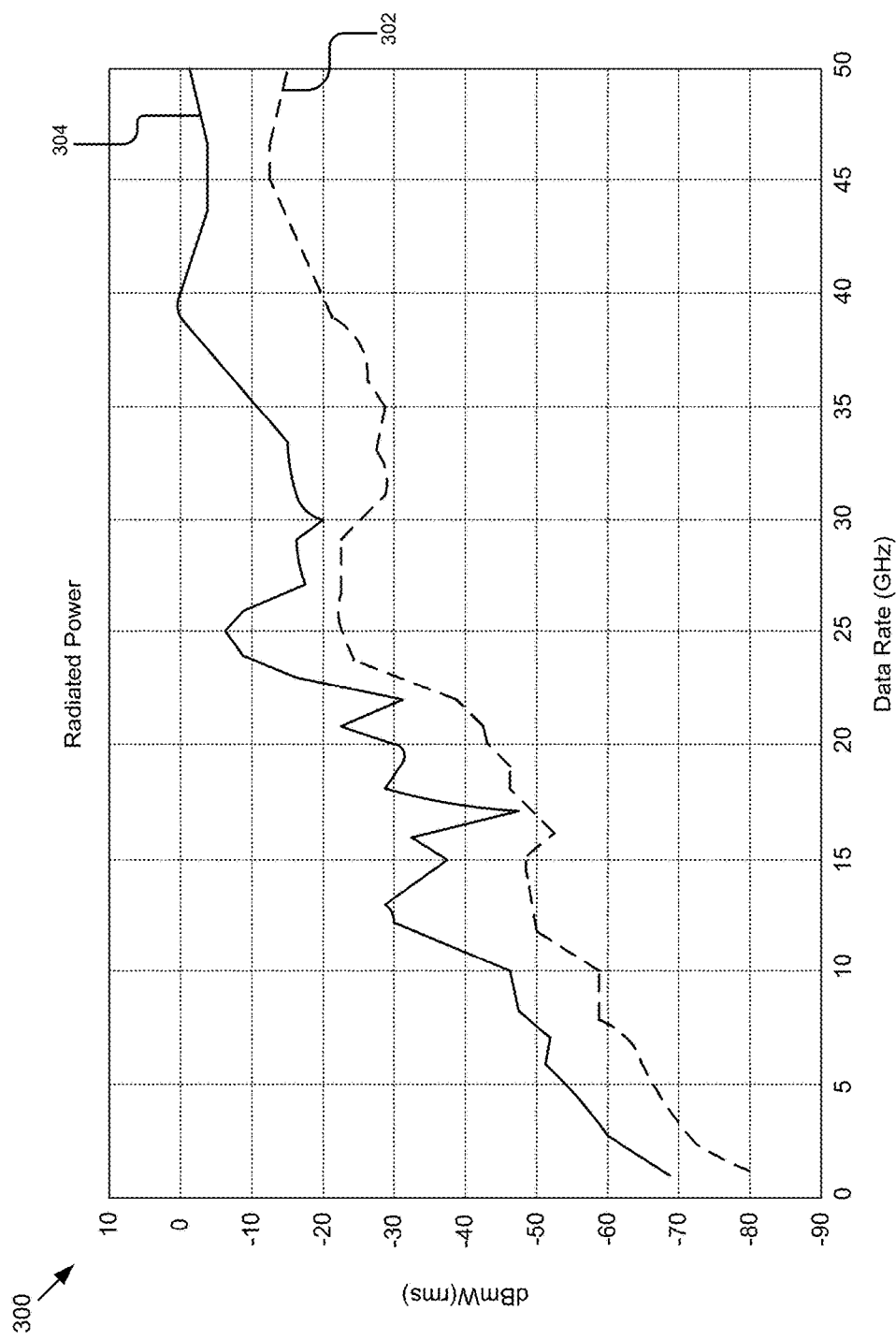
FIG. 3 is an example graphic representation that illustrates simulation results of a 4-channel transceiver with and without phase cancellation.

FIG. 3 is an example graphic representation 300 that illustrates simulation results of a 4-channel transceiver with and without phase cancellation, arranged in accordance with at least some embodiments described herein. A first simulation result 302 that plots an EMI level versus a data rate is obtained with phase cancellation. The first simulation result 302 is generated for parallel laser drivers (e.g., a quad laser driver in a QSFP28 transceiver) that use delayed signals as inputs. The delayed signals may include signals adjusted by respective delay values, and each two adjacent delayed signals may have a phase difference that satisfies a phase delay requirement. A second simulation result 304 that also plots an EMI level versus a data rate is obtained without phase cancellation. The second simulation result 304 is generated for the parallel laser drivers that use the signals as inputs without delaying phases of the signals. A comparison between the first simulation result 302 and the second simulation result 304 illustrates that EMI is reduced by applying phase cancellation described herein. Reduction in the EMI levels between the first simulation result 302 and the second simulation result 304 may be about 10 dB across all the bit rates since bond wires, drivers, and lasers may not be identical in a real system. Cross talk between the parallel laser drivers may also be reduced by applying the phase cancellation.

Figure 4:
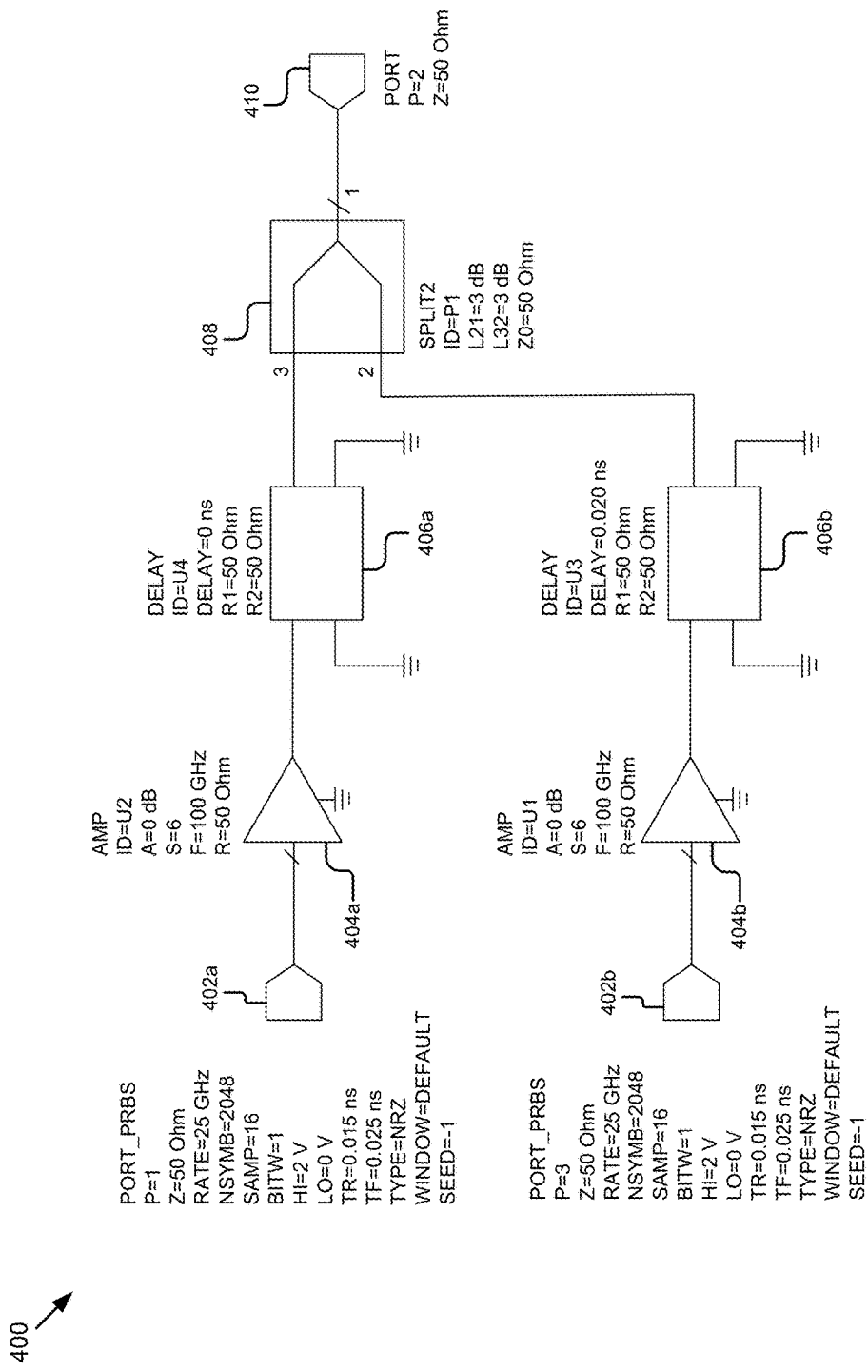
FIG. 4 is a block diagram of a circuit that adds two data streams together.

FIG. 4 shows an example circuit 400 that adds a first data stream and a second data stream together, arranged in accordance with at least some embodiments described herein. The circuit 400 may include an applied wave research (AWR) model. The circuit 400 may include input ports 402a and 402b, amplifiers 404a and 404b, delay units 406a and 406b, an addition unit 408, and an output port 410.

The first data stream may include a pseudorandom binary sequence (PRBS). A rise time and a fall time of a waveform described by the first data stream are unequal. The first data stream is inputted to the circuit 400 from the port 402a. The amplifier 404a amplifies the first data stream. The delay unit 406a delays the first data stream by a first delay value 0 ns and outputs the first delayed data stream to the addition unit 408. The first delayed data stream is the same as the first data stream.

The second data stream is similar to the first data stream. The second data stream may include a PRBS with unequal rise and fall times. The second data stream is inputted to the circuit 400 from the port 402b. The amplifier 404b amplifies the second data stream. The delay unit 406b delays the second data stream by a second delay value 0.020 ns and outputs the second delayed data stream to the addition unit 408. Since a data rate of the circuit 400 is 25 Gb/s, a time duration to transmit a single bit is $1/(25 \times 10^9) = 0.040$ ns. The second delay value 0.020 ns is half of the time duration 0.040 ns. Thus, the second data stream has a half-bit delay relative to the first data stream.

The addition unit 408 adds the first delayed data stream and the second delayed data stream together and outputs a sum of the two delayed data streams at the port 410. A spectrum of the sum of the two delayed data streams is illustrated in FIG. 5.

Figure 5:
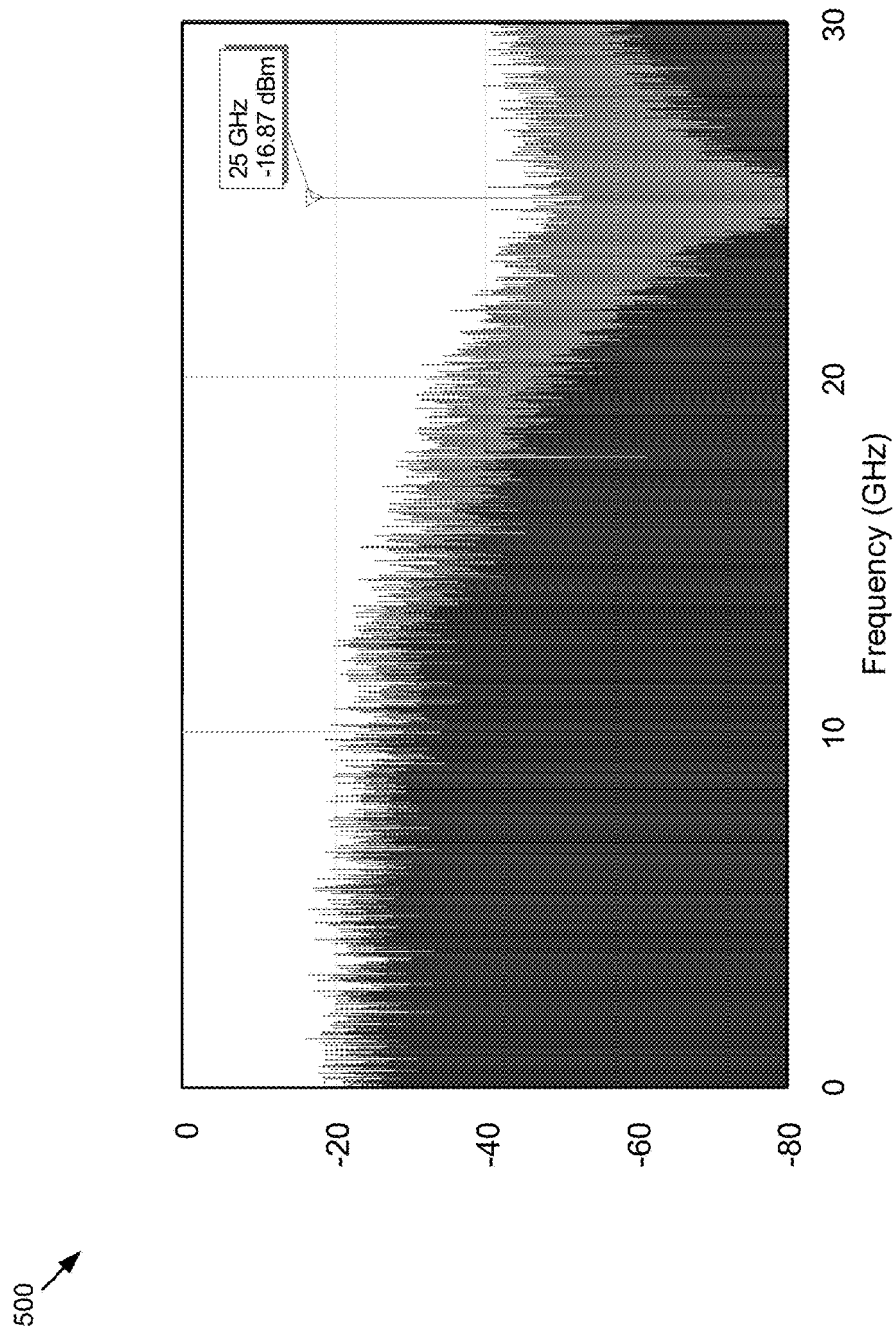
FIG. 5 is an example graphic representation that illustrates a spectrum of a sum of two delayed data streams of FIG. 4.

FIG. 5 is an example graphic representation 500 that illustrates the spectrum of the sum of the two delayed data streams of FIG. 4, arranged in accordance with at least some embodiments described herein. The spectrum of the sum of the two delayed data streams is illustrated with a graph that has a darker color while a spectrum of the second data stream at the port 402b is illustrated with a graph that has a lighter color. The spectrum (e.g., the graph with the lighter color) of the second data stream with a data rate of 25 Gb/s has a peak spectra component −16.87 dBm at a data rate frequency of 25 GHz. The data rate frequency may include a frequency that has the same value as the data rate. Since the first data stream is similar to the second data stream, the first data stream has a spectrum similar to that of the second data stream. By delaying the two data streams by respective delay values and combing the two delayed data streams together, peak spectra components of the two delayed data streams at the data rate frequency are cancelled as well as other spectra components at other frequencies, as illustrated by the spectrum of the sum of the two delayed data streams (e.g., the graph with the darker color). The cancellation of the spectra components may reduce EMI and cross-talk between the data streams.

Figure 7:
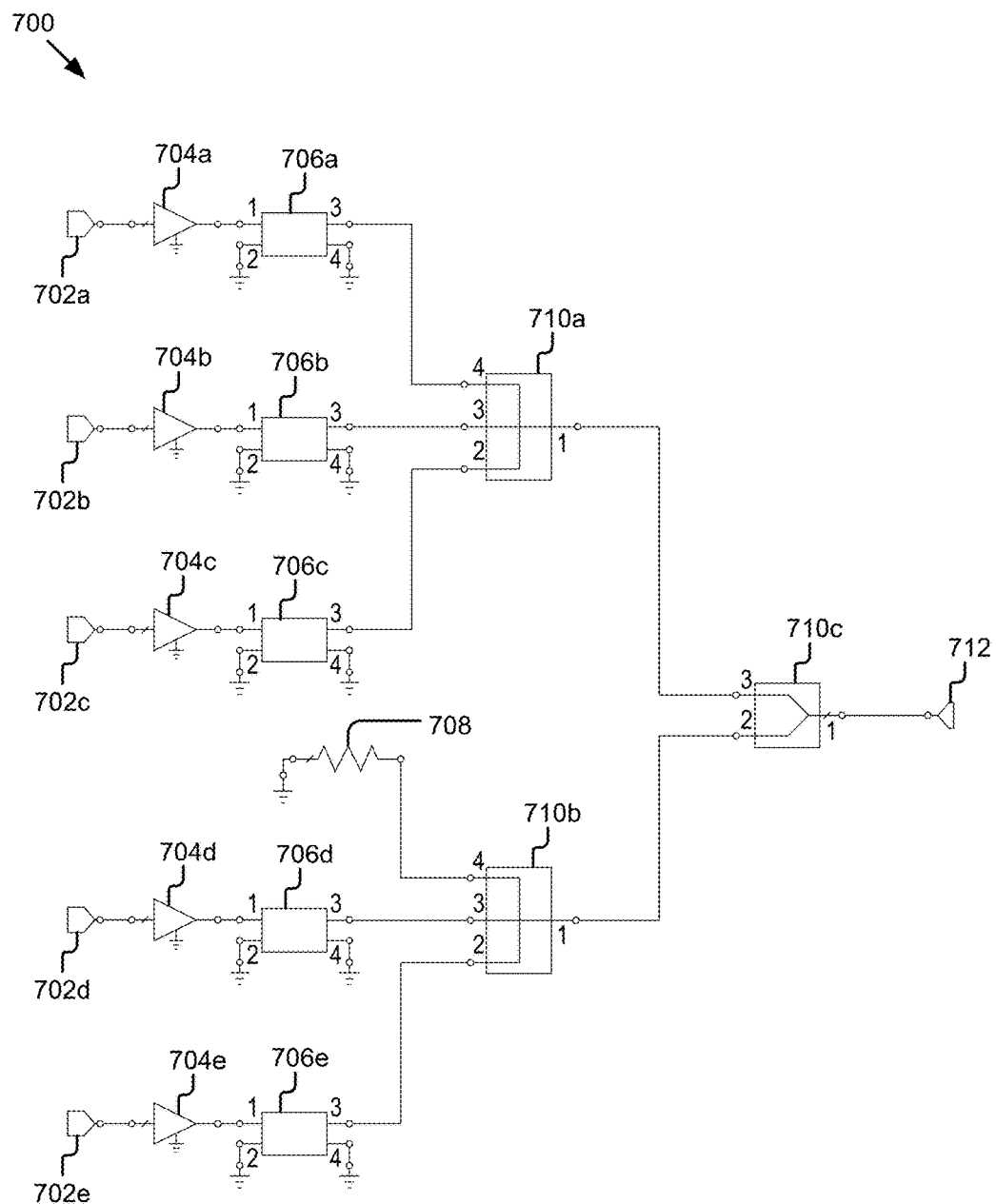
FIG. 7 is a block diagram of a circuit that adds five data streams together.

FIG. 7 shows an example circuit 700 that adds five data streams together, arranged in accordance with at least some embodiments described herein. The circuit 700 may include an AWR model. The circuit 700 may include input ports 702a, 702b, 702c, 702d, and 702e (referred to herein individually or collectively as input port 702), amplifiers 704a, 704b, 704c, 704d, and 704e (referred to herein individually or collectively as amplifier 704), delay units 706a, 706b, 706c, 706d, and 706e (referred to herein individually or collectively as delay unit 706), a resistor 708, addition units 710a, 710b, and 710c (referred to herein individually or collectively as addition unit 710), and an output port 712.

Each input port 702 may receive a respective data stream. Each data stream may include a PRBS. A rise time and a fall time of a waveform described by a corresponding data stream are unequal. Parameters related to each input port 702 may include Z=50 Ohm, RATE=25 GHz, NSYMB=1024, SAMP=16, BITW=1, HI=2 V, LO=0 V, TR=0.015 ns, TF=0.025 ns, TYPE=NRZ, WINDOW=DEFAULT, and SEED=−1.

Each amplifier 704 may amplify a corresponding data stream. Parameters related to each amplifier 704 may include A=4.77 dB, S=6, F=100 GHz, and R=50 Ohm.

Each delay unit 706 may delay a corresponding data stream by a corresponding delay value. Parameters related to each delay unit 706 may include R1=50 Ohm and R2=50 Ohm. The delay unit 706a may delay a first data stream by 0 ns, the delay unit 706b may delay a second data stream by 0.008 ns, the delay unit 706c may delay a third data stream by 0.016 ns, the delay unit 706d may delay a fourth data stream by 0.024 ns, and the delay unit 706e may delay a fifth data stream by 0.032 ns. Since a data rate of the circuit 700 is 25 Gb/s, a time duration to transmit a single bit is $T_B = 1/(25 \times 10^9) = 0.040$ ns. The second data stream is delayed by 0.008 ns, which is $0.008/0.040 = 1/5$ of $T_B$; the third data stream is delayed by 0.016 ns, which is $0.016/0.040 = 2/5$ of $T_B$; the fourth data stream is delayed by 0.024 ns, which is $0.024/0.040 = 3/5$ of $T_B$; and the fifth data stream is delayed by 0.032 ns, which is $0.032/0.040 = 4/5$ of $T_B$. In other words, a corresponding phase difference between each two adjacent delayed data streams includes $2\pi/5$.

Parameters related to the resistor 708 may include R=50 Ohm. Parameters related to the addition unit 710a and 710b may include L21=4.77 dB, L31=4.77 dB, L41=4.77 dB, and Z0=50 Ohm. Parameters related to the addition unit 710c may include L21=3 dB, L31=3 dB, and Z0=50 Ohm. The addition unit 710a may add the first delayed data stream, the second delayed data stream, and the third delayed data stream together to output a first intermediate data stream. The addition unit 710b may add the fourth delay data stream and the fifth delay data stream to output a second intermediate data stream. The addition unit 710c may add the first intermediate data stream and the second intermediate data stream to output a summed data stream at the output port 712. Parameters related to the output port 712 may include Z=50 Ohm.

Figure 6:
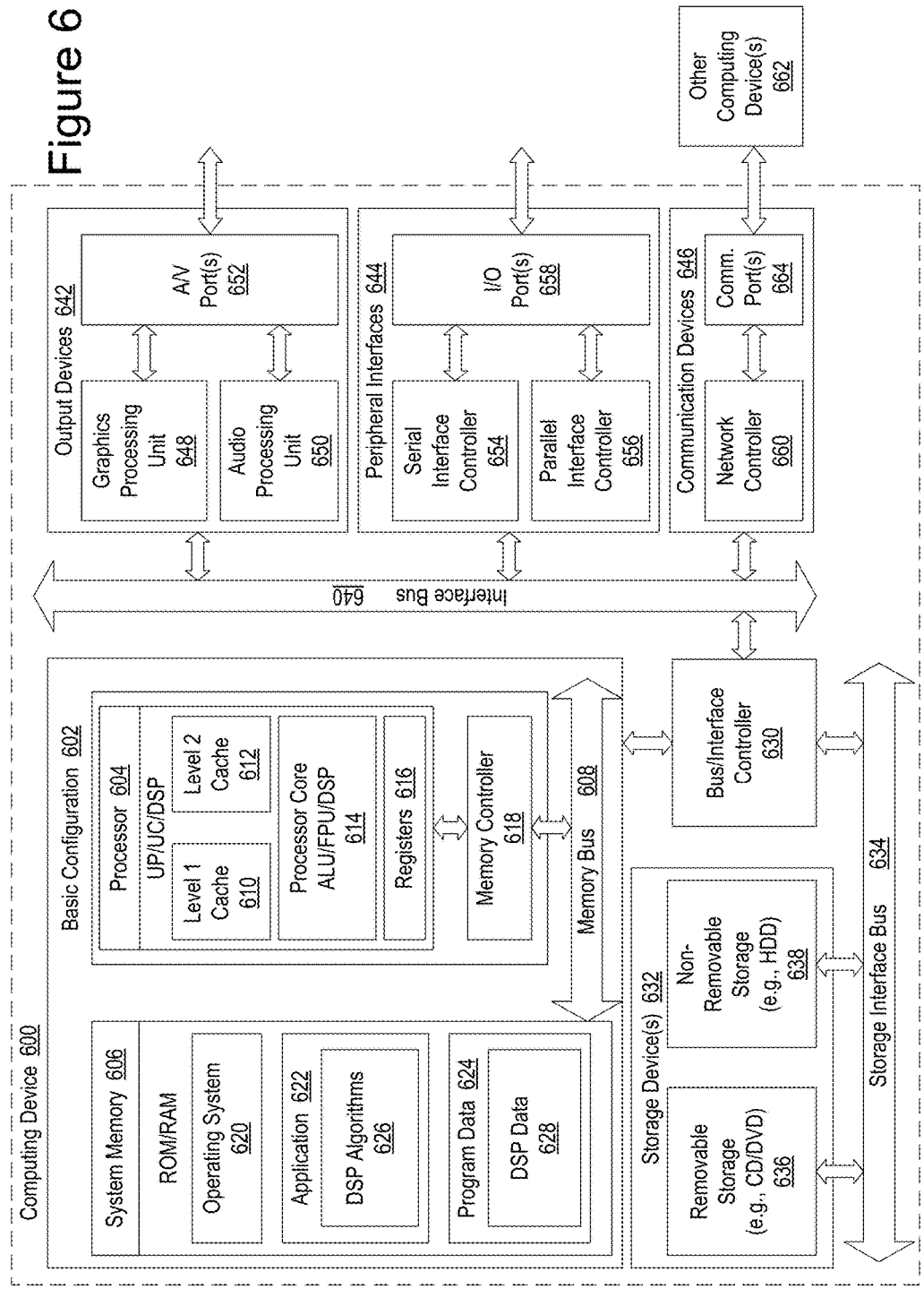
FIG. 6 is a block diagram that illustrates an example computing device that is arranged for implementing digital signal processing techniques in a data communication system.

FIG. 6 is a block diagram that illustrates an example computing device 600 that is arranged for implementing digital signal processing techniques in a data communication system, arranged in accordance with at least some embodiments described herein. In a very basic configuration 602, the computing device 600 may typically include one or more processors 604 and a system memory 606. A memory bus 608 may be used for communicating between the processor 604 and the system memory 606.

Depending on the desired configuration, the processor 604 may be of any type including, but not limited to, a CPU, a µP, a µC, a DSP, or any combination thereof. The processor 604 may include one or more levels of caching, such as a level one cache 610 and a level two cache 612, a processor core 614, and registers 616. The example processor core 614 may include an arithmetic logic unit (ALU), a floating point unit (FPU), a digital signal processing core (DSP core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), non-volatile memory (such as ROM, flash memory), or any combination thereof. The system memory 606 may include an operating system (OS) 620, one or more applications 622, and program data 624. The application 622 may include digital signal processing (DSP) algorithms 626, or other applications that may be arranged to perform or control performance of one or more of the functions as described herein including those described with respect to the method 200 of FIG. 2. The program data 624 may include DSP data 628 that may be pulled into the application 622 for analysis. In some embodiments, the application 622 may be arranged to operate with the program data 624 on the OS 620 such that implementations of a method for reducing EMI such as the method 200 of FIG. 2, may be provided as described herein.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 606, removable storage devices 636, and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device) or other peripheral devices (e.g., printer, scanner) via one or more I/O ports 658. The example communication device 646 may include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of reducing electromagnetic interference (EMI) in a multi-channel transmitter, the method comprising:

receiving multiple signals configured to be transmitted through multiple channels;

adjusting delays of the multiple signals to generate multiple delayed signals, wherein each two adjacent delayed signals are configured to have a corresponding phase difference that satisfies a phase delay requirement, wherein at least one corresponding phase difference between two adjacent delayed signals is different than at least one other corresponding phase difference between two adjacent delayed signals and at least one corresponding phase difference between two adjacent delayed signals is the same or similar to at least one other corresponding phase difference between two adjacent delayed signals; and generating multiple load signals from the multiple delayed signals, wherein the at least one corresponding phase difference between two adjacent delayed signals that is different than at least one other corresponding phase difference between two adjacent delayed signals is determined according to $(\pi-4\pi/N)$ and the at least one corresponding phase difference between two adjacent delayed signals that is the same or similar to at least one other corresponding phase difference is determined according to $2\pi/N$ and N is a number of multiple channels in the multi-channel transmitter.

2. The method of claim 1, wherein:
the multiple signals include a first signal, a second signal, a third signal, and a fourth signal; and
adjusting the delays of the multiple signals comprises:
  delaying the first signal by a first delay value to output a first delayed signal;
  delaying the second signal by a second delay value to output a second delayed signal, wherein the second delay value is configured to cause a corresponding phase difference between the second delayed signal and the first delayed signal to satisfy the phase delay requirement;
  delaying the third signal by a third delay value to output a third delayed signal, wherein the third delay value is configured to cause a corresponding phase difference between the third delayed signal and the second delayed signal to satisfy the phase delay requirement; and
  delaying the fourth signal by a fourth delay value to output a fourth delayed signal, wherein the fourth delay value is configured to cause a corresponding phase difference between the fourth delayed signal and the third delayed signal to satisfy the phase delay requirement.

3. The method of claim 2, wherein the first delay value is zero and the first delayed signal is the same as the first signal.

4. The method of claim 1, wherein each two adjacent delayed signals include two corresponding delayed signals configured to be transmitted on two corresponding adjacent channels from the multiple channels.

5. The method of claim 1, further comprising:
generating multiple optical carriers based on the multiple load signals; and
multiplexing the multiple optical carriers onto an optical link for transmission through the optical link.

6. The method of claim 1, wherein the phase difference between each two adjacent delayed signals is configured to reduce the EMI in the multi-channel transmitter at a data rate frequency.

7. The method of claim 1, wherein the phase difference between each two adjacent delayed signals is configured to reduce cross-talk in the multi-channel transmitter.

8. A system of reducing electromagnetic interference (EMI) in a multi-channel transmitter, the system comprising:
a delay array configured to receive multiple signals configured to be transmitted through multiple channels, the delay array configured to adjust delays of the multiple signals to generate multiple delayed signals, wherein each two adjacent delayed signals are configured to have a corresponding phase difference that satisfies a phase delay requirement wherein at least one corresponding phase difference between two adjacent delayed signals is different than at least one other corresponding phase difference between two adjacent delayed signals and at least one corresponding phase difference between two adjacent delayed signals is the same or similar to at least one other corresponding phase difference between two adjacent delayed signals; and
a laser driver array communicatively coupled to the delay array, the laser driver array configured to receive the multiple delayed signals from the delay array and to generate multiple load signals from the multiple delayed signals, wherein the phase difference between each two adjacent delayed signals that satisfies the phase delay requirement is configured to reduce electromagnetic interference (EMI) emitted by the laser driver array by at least 10 decibels (dB) across all bit rates,
wherein the at least one corresponding phase difference between two adjacent delayed signals that is different than at least one other corresponding phase difference between two adjacent delayed signals is determined according to $(\pi-4\pi/N)$ and the at least one corresponding phase between two adjacent delayed signals that is the same or similar to at least one other corresponding phase difference between two adjacent delayed signals is determined according to $2\pi/N$ and N is a number of multiple channels in the multi-channel transmitter.

9. The system of claim 8, wherein:
the multiple signals include a first signal, a second signal, a third signal, and a fourth signal; and
the delay array is configured to adjust the delays of the multiple signals by:
  delaying the first signal by a first delay value to output a first delayed signal;
  delaying the second signal by a second delay value to output a second delayed signal, wherein the second delay value is configured to cause a corresponding phase difference between the second delayed signal and the first delayed signal to satisfy the phase delay requirement;
  delaying the third signal by a third delay value to output a third delayed signal, wherein the third delay value is configured to cause a corresponding phase difference between the third delayed signal and the second delayed signal to satisfy the phase delay requirement; and
  delaying the fourth signal by a fourth delay value to output a fourth delayed signal, wherein the fourth delay value is configured to cause a corresponding phase difference between the fourth delayed signal and the third delayed signal to satisfy the phase delay requirement.

10. The system of claim 9, wherein the first delay value is zero and the first delayed signal is the same as the first signal.

11. The system of claim 8, wherein each two adjacent delayed signals include two corresponding delayed signals configured to be transmitted on two corresponding adjacent channels from the multiple channels.

12. The system of claim 8, further comprising:
a laser array communicatively coupled to the laser driver array, the laser array configured to receive the multiple load signals from the laser driver array and to generate multiple optical carriers based on the multiple load signals; and
a multiplexer optically coupled to the laser array, the multiplexer configured to multiplex the multiple optical carriers onto an optical link for transmission through the optical link.

13. The system of claim 8, wherein the laser driver array includes multiple laser drivers, and each two adjacent delayed signals are processed by two corresponding adjacent laser drivers from the multiple laser drivers.

14. The system of claim 13, where the multiple laser drivers include parallel laser drivers.

15. The system of claim 8, wherein the corresponding phase difference that satisfies the phase delay requirement includes a value of $2\pi$ divided by a number of the multiple channels in the multi-channel transmitter.

16. The system of claim 8, wherein the phase difference between each two adjacent delayed signals is configured to reduce the EMI emitted by the laser driver array at a data rate frequency.

17. The system of claim 8, wherein the phase difference between each two adjacent delayed signals is configured to reduce cross-talk in the multi-channel transmitter.

18. A multi-channel transmitter with a reduced electromagnetic interference (EMI) emission, the multi-channel transmitter comprising:
  multiple delay units configured to receive multiple signals that are configured to be transmitted through multiple channels, the multiple delay units configured to adjust delays of the multiple signals by respective delay values to generate multiple delayed signals, wherein each two adjacent delayed signals are configured to have a corresponding phase difference that satisfies a phase delay requirement, and the phase difference is configured to reduce EMI emitted by multiple laser drivers by at least 10 decibels (dB) across all bit rates and at least one corresponding phase difference between two adjacent delayed signals is different than at least one other corresponding phase difference between two adjacent delayed signals and is determined according to $(\pi-4\pi/N)$ and at least one other corresponding phase difference is determined according to $2\pi/N$ and N is a number of multiple channels in the multi-channel transmitter;
  the multiple laser drivers communicatively coupled to the multiple delay units, the multiple laser drivers configured to receive the multiple delayed signals from the multiple delay units and to generate multiple load signals from the multiple delayed signals;
  multiple laser diodes communicatively coupled to the multiple laser drivers, the multiple laser diodes configured to receive the multiple load signals from the multiple laser drivers and to generate multiple optical carriers based on the multiple load signals; and
  a multiplexer optically coupled to the multiple laser diodes, the multiplexer configured to multiplex the multiple optical carriers onto an optical link for transmission through the optical link.

* * * * *